UNITED STATES PATENT OFFICE.

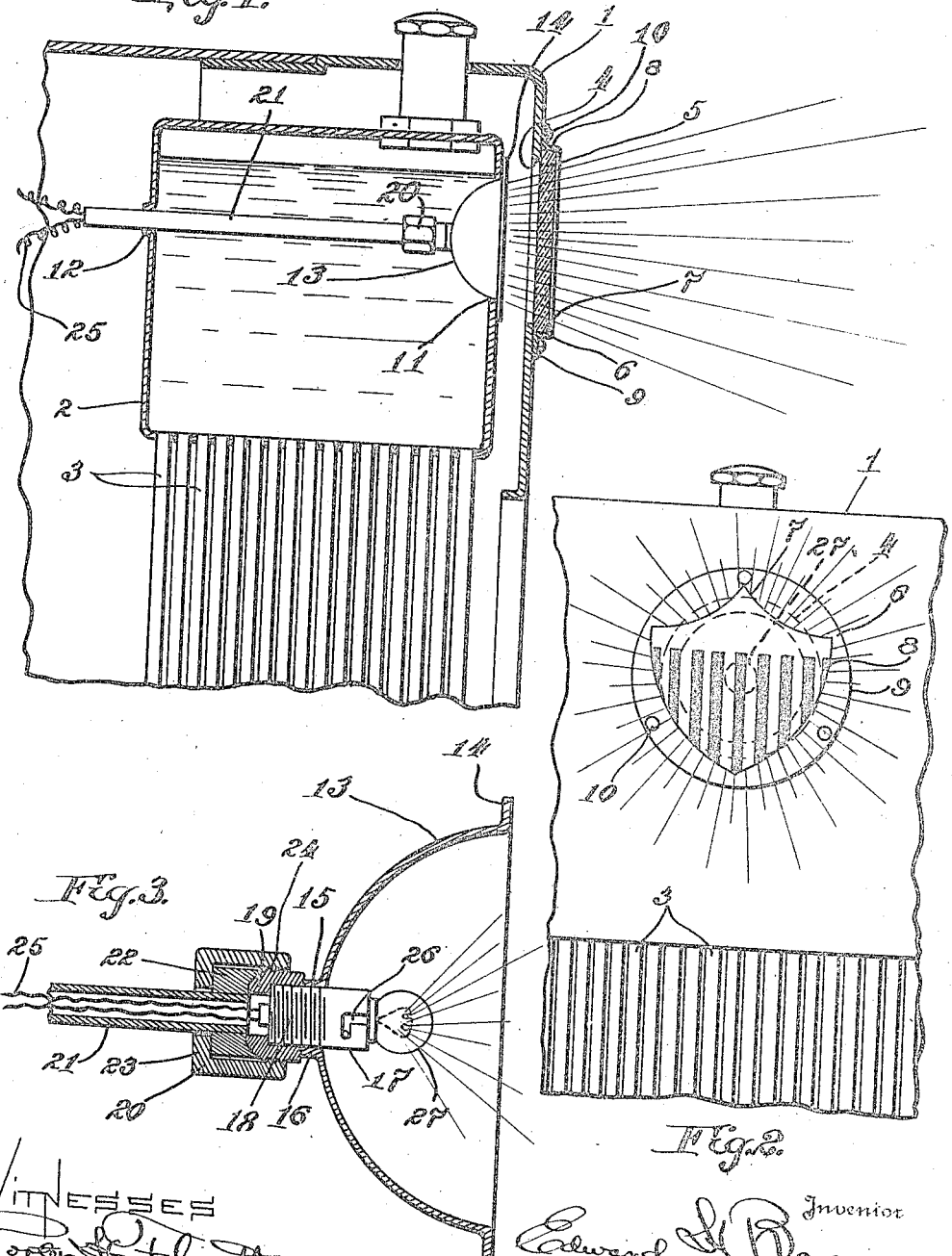

EDWARD H. BAUSMAN, OF BALTIMORE, MARYLAND.

ILLUMINATED MARKER.

1,423,641.  Specification of Letters Patent.  Patented July 25, 1922.

Application filed December 24, 1921. Serial No. 524,648.

*To all whom it may concern:*

Be it known that I, EDWARD H. BAUSMAN, a citizen of the United States of America, residing in the city of Baltimore, State of Maryland, have invented certain new and useful Improvements in Illuminated Markers, of which the following is a specification.

The difficulty incident to reading automobile name plates, trade-marks and the like, at night or in ill-lighted places is well understood and is appreciated. The dealers' names and trade-marks ordinarily appear on the radiator shell near the top, and other insignia might to advantage be similarly placed.

The invention relates to means for illuminating a number or name plate, trade-mark or other insignia so located, the arrangement being preferably such that the name, number, or other inscription is seen by transmitted, as distinguished from reflected light, i. e., the light shines through the plate which is of transparent material such as glass, the source of illumination being located within the shell behind the transparent plate.

An important feature of the invention is that it may be applied to any automobile the radiator of which is enclosed within a shell which is almost universal practice. More particularly the shell is provided with a transparent plate, in place of the usual name plate, having the desired insignia produced thereon and the tank which is usually of sheet metal, is provided with a bowl seated in the tank, the bowl or shell being connected at the rear or bottom of the cup, a water tight tube which runs backward preferably through the tank to serve as a conduit for the wires which supply current to the bulb which is located in the bowl and serves as a source of illumination.

The top tank of the radiator in any automobile can easily be apertured to receive the cup or socket at the front side and punched to receive the pipe or conduit in the rear, and these parts can be conveniently seated in the openings, the joints being sealed by means of solder or in any other convenient manner. The device assembled as illustrated can be sold as a complete accessory ready to be installed in any car or it is equally available without change as stock equipment capable of being used by any manufacturer.

In the accompanying drawings I have illustrated an illuminated name plate together with the entire equipment duly installed in a typical automobile radiator.

In the drawings:

Figure 1 is a vertical central fore and aft section through the radiator tank and shell illustrating the illuminating device, conduit and light cup in elevation and showing the name-plate in section;

Figure 2 is a front elevation showing the radiator shell and a portion of the radiator tubes fragmentarily, the name-plate of the invention appearing centrally of the fragment illustrated;

Figure 3 is a vertical central section of the illuminating device showing the cup, the conduit and the pipe fitting which connects the same in section, the plug and lamp bulb being shown in elevation.

Referring to the drawings by numerals, the illustration includes an automobile radiator shell 1 enclosing an ordinary automobile radiator, the upper tank being indicated by reference character 2, from this the radiator tubes 3 lead downward toward the lower tank not shown. In accordance with the preferred embodiment of the invention the radiator shell 1 is apertured at 4, the aperture occupying the position of the usual name plate or trade-mark. This aperture in the device of the illustration is covered by a transparent or translucent plate 5, which may be of glass or other suitable material and which bears the desired insignia in the form of name, number, trade-mark or the like, the plate being held in position by any suitable means as a sheet metal frame 6 apertured at 7 to expose the insignia on the plate and offset at 8 to provide for the thickness of the plate, the edge of the frame being formed into a circumferential flange 9 which is riveted, screwed or bolted or even soldered, to the shell. In the present instance suitable rivets are illustrated at 10. Directly back of and in alignment with the opening 4 in the shell, the top tank 2 is apertured at 11, the aperture being most conveniently made circular, the rear wall of the tank is also punched or apertured at 12, preferably in alignment with the axis of the opening 11, or at any convenient point, the hole being of small diameter and adapted to fit and receive the pipe or conduit to be described. Seated in the opening 11 is a substantially hemispherical bowl or cup 13 which conveniently serves as a reflector, the maximum circumference of the cup being such as to exactly fit the opening 11, and the periphery of the cup being provided with a flange 14 which bears against the outer surface of the tank along the entire periphery of the opening 11. The reflector cup or bowl 13 has a central opening 15 surrounded by a shank or neck 16 in which is seated a lamp socket plug 17, the contacting surface of the plug with the opening 15 being preferably sealed by means of solder, the end portion of the plug being threaded at 18.

The threaded portion of the plug 17 is screwed into the male member 19 of a union 20 by which the lamp socket 17 is secured to the pipe or conduit 21, the latter being, in the form illustrated, provided with a permanently attached collar 22 which cooperates with and is seated in the female member 23 of the union, the same being held under pressure by tightening the threaded connection 24 between the two members of the union. The pipe 21° as foresaid passes through the radiator projecting from the rear by way of the opening 12 in which it may be soldered or otherwise sealed and the wires 25 being led from the battery or generator through the conduit are secured to suitable terminals not shown in the socket plug 17. The lamp bulb seated in the socket and held therein by means of the usual bayonet slot connection 26 is illustrated at 27.

The device may be conveniently applied by the manufacturer in an obvious manner without altering the radiator construction except to the extent of providing the apertures referred to and seating the bowl or cup 13 and conduit 21 therein and affixing the transparent name-plate 5 over the opening 4 in place of the ordinary name-plate.

In the case of a machine which is already assembled, it is desirable, if not necessary, to remove the outer shell 1 of the radiator when the aperture 4, if not already provided, is cut and the plate secured over the aperture by riveting the frame 6 to the shell. The openings 11 and 12 are then cut and the bowl or cup 13 with the conduit 21 are inserted in the manner illustrated, the wires being passed through the conduit and secured to the terminals in the plug before the plug with the bowl is secured to the male member of the union, the plug having been seated in the male member of the union and the parts having been soldered in the openings 11 and 12, the installation is complete, it being merely necessary to replace the radiator shell.

It will thus be apparent as foresaid that the equipment illustrated may be not only treated as stock equipment but may be handled as an accessory, being inserted in any machine without replacement of any feature of the regular construction.

I have thus described specifically and in detail a single embodiment of my invention in the preferred form in order that the nature and operation of the same may be clearly understood, however, the specific terms herein are used descriptively rather than in a limiting sense, the scope of the invention being defined in the claims.

What I claim and desire to secure by Letters Patent is:

1. In combination with an automobile radiator having an external shell and a tank enclosed thereby, a bowl seated in the tank, an electric bulb in the bowl, a conduit with wiring therein leading therefrom through the tank and a transparent name-plate secured to the shell in alignment with the bowl and exposed to illumination from the rear by a suitable opening in the shell.

2. In combination with an automobile radiator having a shell and a tank, a cup in the front of the tank having a lamp socket, a lamp bulb therein, a conduit leading to the socket, and a transparent plate having a legend thereon seated in the shell in front of the cup.

3. An automobile accessory consisting of a cup having a peripheral flange, same being adapted for water tight engagement with the surface of an automobile radiator tank, a lamp socket seated in the center of the cup and a conduit for wires having a water tight connection with the cup and leading backward from the socket, a transparent member with a legend thereon and a frame for holding said member in position on the radiator shell.

Signed by me at Baltimore, Maryland, this 21st day of December, 1921.

EDWARD H. BAUSMAN.

Witnesses:
PORTER H. FLAUTT,
CARRIE M. REELY.